US011162441B2

(12) United States Patent
Archer et al.

(10) Patent No.: US 11,162,441 B2
(45) Date of Patent: Nov. 2, 2021

(54) JUMPING CYLINDER DEACTIVATION MODES TO AVOID ENGINE RESONANCE (71) Applicant: Eaton Intelligent Power Limited, Dublin (IE)

(72) Inventors: Akibi Archer, Kalamazoo, MI (US); James McCarthy, Jr., Kalamazoo, MI (US); Mark Osinski, Kalamazoo, MI (US)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 16/624,482

(22) PCT Filed: Jun. 20, 2018

(86) PCT No.: PCT/IB2018/054561
§ 371 (c)(1),
(2) Date: Dec. 19, 2019

(87) PCT Pub. No.: WO2018/235023
PCT Pub. Date: Dec. 27, 2018

(65) Prior Publication Data
US 2020/0123988 A1  Apr. 23, 2020

Related U.S. Application Data (60) Provisional application No. 62/522,669, filed on Jun. 20, 2017, provisional application No. 62/611,530, filed on Dec. 28, 2017.

(51) Int. Cl.
*F02D 17/02* (2006.01)
*F02D 13/06* (2006.01)
(52) U.S. Cl.
CPC ............. *F02D 17/02* (2013.01); *F02D 13/06* (2013.01); *F02D 2200/101* (2013.01)

(58) Field of Classification Search
CPC .... F02D 17/02; F02D 13/06; F02D 2200/101; F02D 2041/0012; F02D 2250/28; F02D 41/0087; F02D 41/0082; Y02T 10/12
See application file for complete search history.

(56) References Cited

U.S. PATENT DOCUMENTS

2008/0154468 A1    6/2008  Berger et al.
2009/0292439 A1   11/2009  Luken et al.
(Continued)

FOREIGN PATENT DOCUMENTS

DE    102013114956 A1    7/2014
EP       2123885 A1     11/2009

OTHER PUBLICATIONS

International Search Report and Written Opinion for PCT/IB2018/054561, dated Oct. 15, 2018 pp. 1-17.

*Primary Examiner* — Joseph J Dallo
(74) *Attorney, Agent, or Firm* — Mei & Mark, LLP (57) ABSTRACT A method for jumping cylinder deactivation ("CDA") modes to avoid a primary powertrain resonant frequency in a six-cylinder diesel engine-powered machine comprises operating an engine between an idled condition and a first engine speed limit in one of a two-cylinder CDA mode or a four-cylinder CDA mode. The method operates the engine between the first engine speed limit and a second engine speed limit in a three-cylinder CDA mode. The first engine speed limit is an engine speed below which the two-cylinder or four-cylinder CDA mode causes the machine to operate below a primary powertrain resonant frequency and also above which the three-cylinder CDA mode causes the machine to operate above the primary powertrain resonant frequency, thus avoiding the primary powertrain resonant frequency during operation. A CDA mode can be selected (Continued)

above the second engine speed limit to operate the machine above the primary powertrain resonant frequency.

20 Claims, 4 Drawing Sheets

(56) References Cited

U.S. PATENT DOCUMENTS

| | | |
|---|---|---|
| 2011/0029222 A1 | 2/2011 | Luken et al. |
| 2015/0369140 A1 | 12/2015 | Wagh et al. |
| 2017/0350333 A1* | 12/2017 | Glugla ................ F02D 41/1446 |
| 2019/0376459 A1* | 12/2019 | Pieczko ............. F02D 13/0203 |

* cited by examiner

JUMPING CYLINDER DEACTIVATION MODES TO AVOID ENGINE RESONANCE

This is a § 371 National Stage Entry claiming the benefit of priority of PCT/I62018/0554561 filed Jun. 20, 2018 and claims the benefit of U.S. provisional application No. 62/522,669, filed Jun. 20, 2017 and claims the benefit of U.S. provisional application No. 62/611,530, filed Dec. 28, 2017, all of which are incorporated herein by reference.

FIELD

This disclosure provides a system and methods for jumping modes to avoid resonance to engine acceleration and engine deceleration.

BACKGROUND

CDA (Cylinder Deactivation, where the intake and exhaust valves are held closed while fuel is cut off to the cylinder) strategies can be employed on internal combustion engines to provide improved engine efficiencies. CDA can be operated at various points in the engine speed-load map. In some instances however it can also provide a negative aspect of exciting undesirable vibration modes leading to deleterious resonance. It is long felt and unmet need to minimize these negative characteristics.

SUMMARY

The methods and systems disclosed herein overcome the above disadvantages and improves the art by solving the long felt and unmet need to enable CDA despite resulting torsional vibrations. While both torsional and linear vibrations need to be accounted for, this work addresses torsional vibrations.

A method for mitigating noise, vibration and harshness for cylinder deactivation on diesel engines avoids a primary powertrain resonant frequency.

A method for jumping cylinder deactivation ("CDA") modes to avoid a primary powertrain resonant frequency in a six-cylinder diesel engine-powered machine comprises operating an engine between an idled condition and a first engine speed limit in one of a two-cylinder CDA mode or a four-cylinder CDA mode. The method operates the engine between the first engine speed limit and a second engine speed limit in a three-cylinder CDA mode. The first engine speed limit is an engine speed below which the two-cylinder or four-cylinder CDA mode operates below a primary powertrain resonant frequency and also above which the three-cylinder CDA mode operates above the primary powertrain resonant frequency, thus avoiding the primary powertrain resonant frequency during operation.

A second engine speed limit can be used to select a CDA mode that causes the machine to operate above the primary powertrain resonant frequency. So, the second engine speed limit is an engine speed above which the two-cylinder CDA mode or the four-cylinder CDA mode causes the machine to operate above the primary powertrain resonant frequency and also below which the three-cylinder CDA mode causes the machine to operate above the primary powertrain resonant frequency, thus avoiding the primary powertrain resonant frequency during operation.

The CDA mode selection techniques outlined herein jump the CDA modes over the primary powertrain resonant frequency so that the CDA modes do not add to the deleterious resonance in the system.

Additional objects and advantages will be set forth in part in the description which follows, and in part will be obvious from the description, or may be learned by practice of the disclosure. The objects and advantages will also be realized and attained by means of the elements and combinations particularly pointed out in the appended claims.

DETAILED DESCRIPTION

Reference will now be made in detail to the examples which are illustrated in the accompanying drawings. Wherever possible, the same reference numbers will be used throughout the drawings to refer to the same or like parts. Directional references such as "left" and "right" are for ease of reference to the figures.

It is possible to operate CDA over the engine speed-load map while avoiding deleterious resonance. This disclosure provides methods for jumping modes to avoid resonance during engine acceleration and engine deceleration.

A simple control strategy is provided that lessens processing and quantification burdens. Accounting for losses across the clutch and transmission, it is possible to select CDA modes based on measurements at the flywheel of the engine. For example, an output of 500 rad/sec$^2$ at the flywheel can reduce down to 300 rad/sec$^2$ at the transmission output shaft due to damping and losses across the clutch and transmission. The vehicle driveline can distribute that transmission output in known ways, and within the torsional vibration limits of the vehicle. Knowing the characteristics of the clutch and transmission, and knowing the losses experienced between the engine flywheel and the transmission output, a control strategy for implementing cylinder deactivation can rely on flywheel output as a control parameter for selecting the number of cylinders deactivated versus firing.

Vibration levels of an engine during cylinder deactivation can be generally high. Acceptable vibration holds below 700 rad/sec$^2$, more preferably below 500 rad/sec$^2$, and even more preferably below 400 rad/sec$^2$ when applied to state of the art transmission and clutches for heavy duty diesel. During a speed sweep, the vibration levels of an engine in cylinder deactivation (CDA) mode can be four times as high as the vibration level of the engine with six cylinders operating. The present disclosure provides a method for operating at a described level of CDA (2, 3, 4, 6 cylinders deactivated) so as to maintain the torsional engine at or below a specified level (i.e., 400 rad/sec$^2$, 500 rad/sec$^2$, 700 rad/sec$^2$). In one exemplary method, the engine is operated at idle in either 6, 4 or 2 cylinder operation for a heavy duty diesel engine up to approximately 700 to 750 revolutions per minute (RPM). Then a shift to either 6 cylinder or 3 cylinder mode is made to keep the vibration under 500 rad/sec$^2$, preferably below 400 rad/sec$^2$. Next, the engine is operated above 1000 to 1100 RPM and in 2, 3, 4 or 6 cylinder firing operation to maintain vibration below 500 rad/sec$^2$, preferably below 400 rad/sec$^2$. An algorithm (or state machine/ look up table) can be developed to also use temperature to determine optimal CDA mode within various acceptable vibration levels.

A method is provided for operating at a described level of CDA (2, 3, 4, 6 cylinder) so as to maintain the torsional engine at or below a specified level (i.e., 400 rad/sec², 500 rad/sec², 700 rad/sec²) so as to allow for CDA mode use. In other words, this would determine which CDA mode (2, 3, 4, 6) would provide the most efficient engine operation, should all of them provide acceptable vibration.

Figure 1:
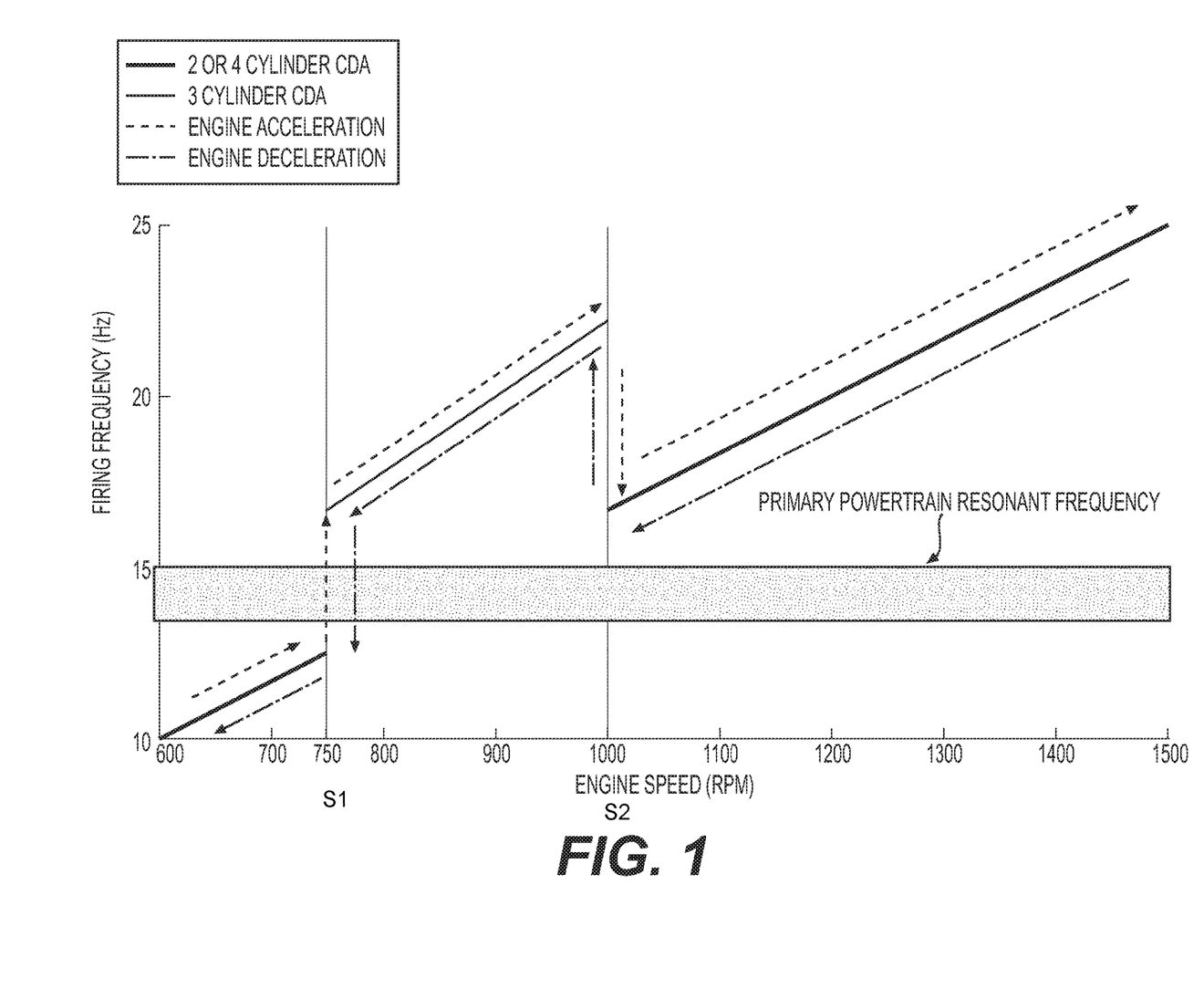
FIG. 1 illustrates a technique for accelerating and decelerating an engine while jumping CDA modes to avoid a primary powertrain resonant frequency.
Figure 2:
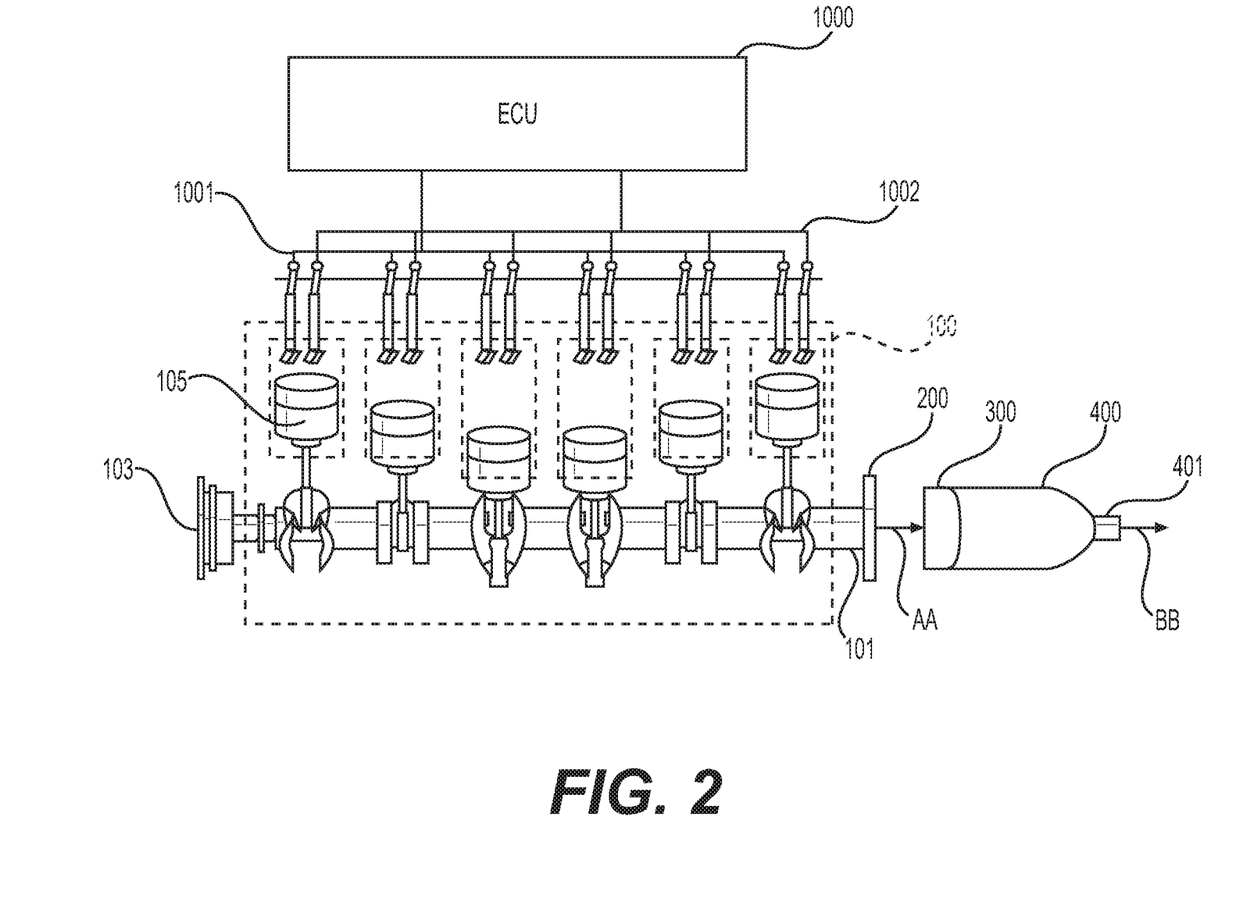
FIG. 2 is an explanatory schematic for a machine.
Figure 3:
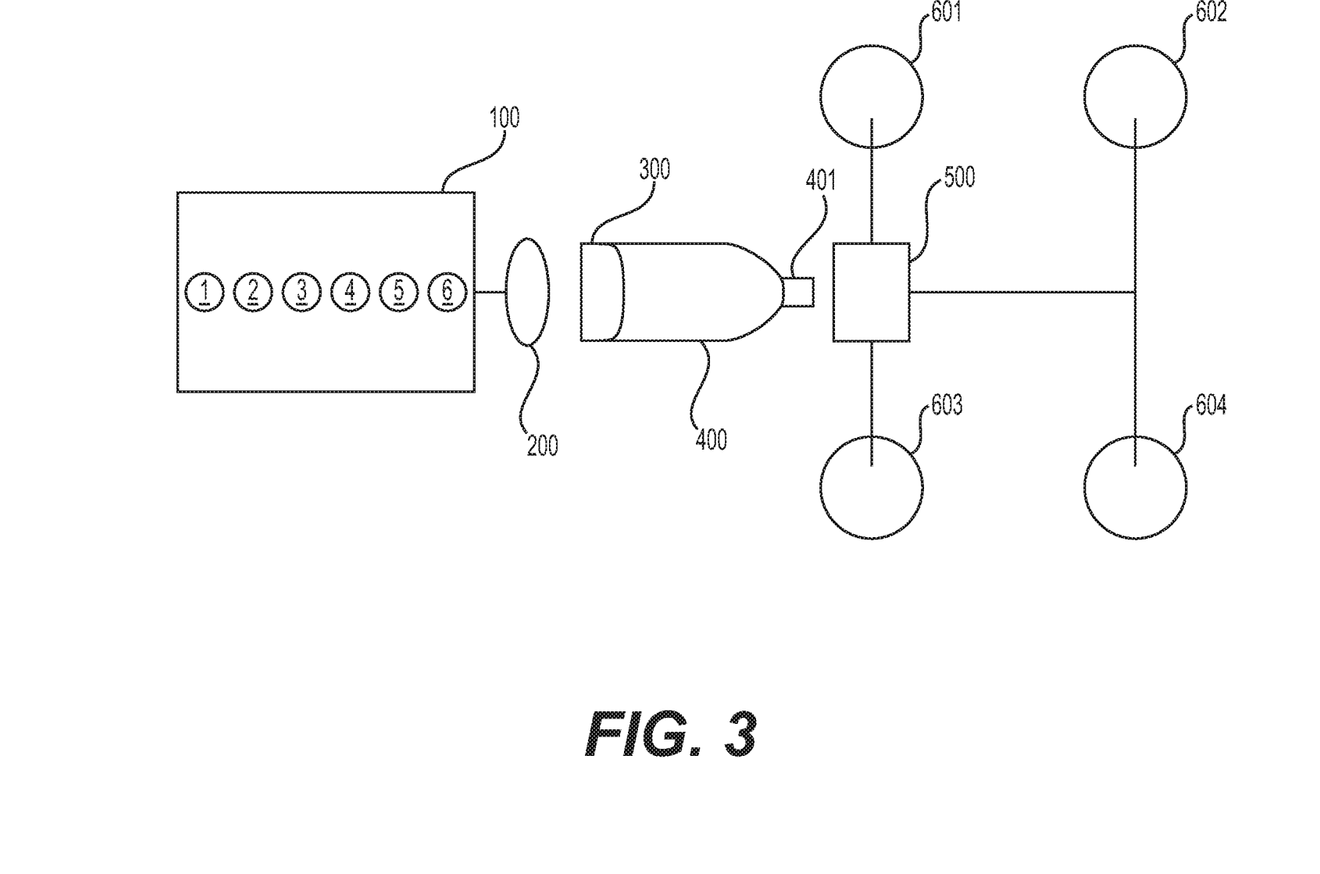
FIG. 3 is another explanatory schematic for a machine.
Figure 4:
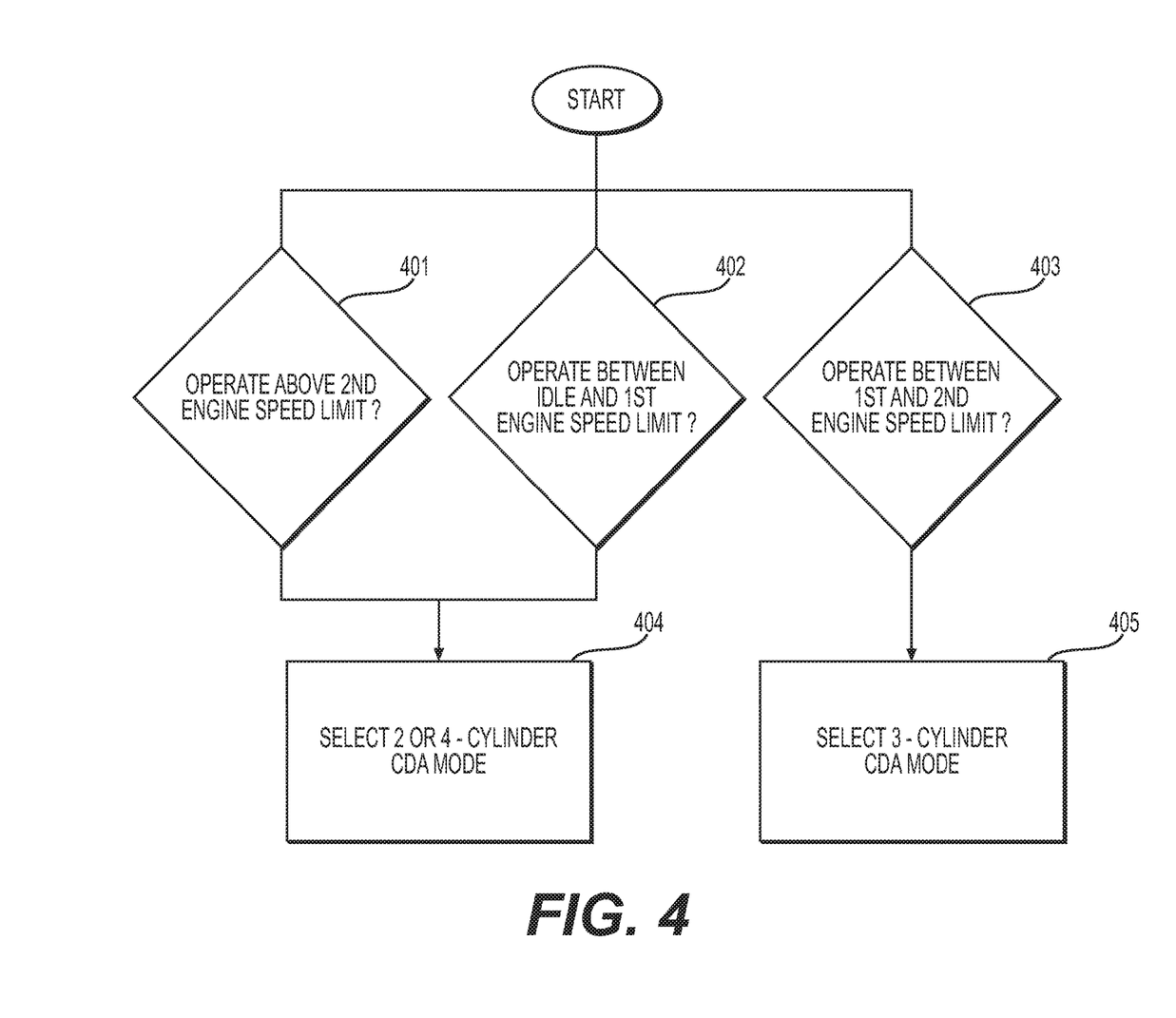
FIG. 4 is a decision tree for jumping CDA modes to avoid engine resonance.

A system is described in FIGS. 2 & 3 for enabling the method of FIGS. 1 & 4 for jumping cylinder deactivation ("CDA") modes to avoid a primary powertrain resonant frequency in a six-cylinder diesel engine-powered machine.

A diesel engine-powered machine can comprise a variety of devices, such as light duty trucks, buses, medium duty or heavy duty vehicles, off-road vehicles, and the like. While the disclosed 6-cylinder engine can be scaled for engine size, and while the principles can be adapted for other numbers of cylinders, such as 4 or 8, the brevity of the disclosure is maintained by looking to a 6-cylinder engine 100 having 6 cylinders 1-6. Pistons 105 reciprocate in respective cylinders 1-6. A crankshaft 101 is coupled via pivoting mechanisms and counterweights to each piston 105. The pistons 105 are arranged on the crankshaft 101 to provide firing periods and firing frequencies as shown in Table 1. A flywheel 200 is coupled to one end of the crankshaft 101 and a pully hub 103 or the like is at a second end of the crankshaft 101. The pulley hub 103 can be coupled to other engine parts, such as one or more cam rail for actuating the valves.

TABLE 1

| CYLINDER MODE | FIRING PERIODS PER 2 CRANKSHAFT REVOLUTIONS (720 DEGREES) | FIRING FREQUENCY; FIRINGS PER 2 CRANKSHAFT REVOLUTIONS (720 DEGREES) |
|---|---|---|
| NORMAL (ALL CYLINDERS) FIRING | 6 | 6 |
| 3-CYLINDER CDA | 3 | 3 |
| 2-CYLINDER CDA | 2 | 4 |
| 4-CYLINDER CDA | 2 | 2 |

The valves can be connected to an electronic control unit ("ECU") 1000 for implementing variable valve actuation techniques such as cylinder deactivation, engine braking, late or early valve opening or closing, among others. ECU 1000 comprises at least a processor, memory device, and algorithms for implementing the methods disclosed herein. ECU comprises additional connectivity for sensing engine operation, such as a synchronous sensor on or near the flywheel or equivalent engine speed sensor for collecting engine speed data. Engine speed data can be used for various purposes, including active engine control and failsafe engine control. So, ECU 1000 can comprise computational and processing capabilities to collect and process real-time data and to execute commands based on stored data. For example, a look-up table (LUT) can be used for correlating engine speed to one or more or of firing frequency, load on the machine, torque output of the engine, cylinder deactivation mode, among others.

Since the primary powertrain resonant frequency occurs at a machine-specific firing frequency across all engine speeds, the method herein can comprise sensing engine speed during machine operation to detect the first engine speed limit and the second engine speed limit. The sensed engine speeds can be processed in the ECU 1000 and the algorithms stored therein can be configured to output detection of the first engine speed limit and the second engine speed limit when they occur.

A failsafe can be executed by solving for the firing frequency of the engine during machine operation by processing information comprising the sensed engine speed and the number of cylinders that are deactivated versus firing. The failsafe adjusts the number of cylinders that are deactivated versus firing when solving for the firing frequency of the engine indicates that operation in the primary powertrain resonant frequency is imminent. To assist with the fail safe operation, an engine operation trend can be detected. So, if the engine speed is increasing, indicating an engine operation trend of acceleration, the number of cylinders that are deactivated versus firing can be adjusted according to the engine acceleration line in FIG. 1. If the engine speed is decreasing, indicating an engine operation trend of deceleration, then the ECU 1000 can implement the failsafe according to the engine deceleration line of FIG. 1.

An intake valve control bus 1001 can connect to the intake valves to control actuators for opening or closing the intake valves. Likewise, an exhaust valve control bus 1002 can connect to the exhaust valves to control actuators for opening or closing the exhaust valves. An additional control bus can be included for controlling fuel injection to the cylinders.

Diesel engine 100 is configured to implement cylinder deactivation of select cylinders. All-cylinder deactivation is also contemplated, and the full-firing operation of all 6 cylinders 1-6 is enabled. The diesel engine 100 comprises multiple combustion cylinders 1-6, reciprocating pistons 105 for reciprocating in the combustion cylinders 1-6, a crankshaft 101 coupled to the reciprocating pistons 105, a flywheel 200, at least one fuel injector for each combustion cylinder 1-6 for selectively injecting fuel in to the combustion cylinders, controllable intake valves connected to intake valve bus 1001 configured for selective opening and closing for controlling intake of charge air to the combustion cylinders, controllable exhaust valves connected to exhaust valve bus 10002 configured for selective opening and closing for controlling exhaust of fluid from the combustion cylinders, and a control system comprising the ECU 1000, the ECU 1000 comprising at least a processor, a memory device, and processor-executable instructions stored in the memory device. The processor-executable instructions are configured for implementing the methods disclosed herein.

The flywheel 200 outputs torque from the engine to power the machine. The torque is transferred from the flywheel 200 to, for example, a clutch 300 and transmission 400. An output shaft 401 of the transmission can couple directly to, or be configured to selectively couple as by a power take off ("PTO") unit 500, to a vehicle driveline. The vehicle driveline can comprise a main axle and additional axles connecting wheels 601-604 thereto. The machine is not limited to 4-wheeled devices and the machine can comprise more or less wheels, such as an 18-wheeler tractor trailer, a 6-wheeled sleeper cab, among others.

The radian per second squared (symbolized rad/sect or rad/s²) is the unit of angular (rotational) acceleration magnitude in the International System of Units. Two instances of angular acceleration magnitude are shown in FIG. 2, at arrow AA and arrow BB. The arrows represent the rate of change of angular speed of the flywheel 200 and transmission output shaft 401, respectively. The angular acceleration vector has a direction component that can be defined as either counterclockwise or clockwise.

In the above discussion, an output represented by arrow AA of 500 rad/sec2 at the flywheel 200 can drop to an output represented by arrow BB of 300 rad/sec2 at the transmission output shaft 401. The force on the driveline causes noise, vibration, and harshness (NVH) on the driveline. At key frequencies, resonance can occur. First order resonance is the most severe resonance as far as user experience and deleterious effects on the vehicle. Most machine manufacturers focus on damping and accounting for the first order resonance. Additional orders of resonance, such as half order, second order, among others, can occur. The methods surrounding FIG. 1 focus on the first order resonance, herein the primary powertrain resonant frequency.

A long felt need in diesel engines has been to use cylinder deactivation techniques despite the existing first order resonance of the vehicle. The techniques disclosed herein improve the field of diesel engine cylinder deactivation techniques by formulating methods for implementing cylinder deactivation without re-designing the clutch, transmission, or other driveline components and without adding expensive dampers above and beyond those already existing on the machine. The long felt need is satisfied by the inventors' discoverey of unexpected results when studying the angular acceleration magnitude of various CDA modes. Initially it was thought that 4-cylinder deactivation mode and 2-cylinder deactivation mode would have different dominant orders for deleterious resonance, but after collecting and analyzing the data it was found that the dominant orders were the same orders and the inventors worked to find out why that was the case. The inventors discovered that the number of periods per revolution is the major driver in the dominant order for primary powertrain resonant frequency.

Because of the different levels of torque output by the crankshaft 101 when switching between 2-, 3-, 4-, or 6-cylinder deactivation modes and full engine firing mode, it was expected to see different noise signatures for each firing or deactivation mode. However, while simulating an attached vehicle via a dynamometer ("dyno"), the inventors unexpectedly discovered that the noise signature for 2- and 4-cylinder deactivation modes is almost the same, permitting those two modes to be used interchangeably from a noise standpoint. By implementing a 4-stroke firing pattern on 6-cylinders across 720 degrees of crankshaft rotation, the 2- and 4-cylinder deactivation modes have the different firing frequency, and thus different torque. But, the engine fires on the same periods within the firing frequency, leading to the same noise signature for 2- and 4-cylinder deactivation modes. So, if the 6 cylinders are fired in the order 1 5 3 6 2 4, and cylinders 1 & 6 are deactivated in 2-cylinder deactivation mode and cylinders 1, 5, 6, & 2 are deactivated in 4-cylinder deactivation mode, then the two deactivation modes have firing frequencies on the same period. The inventors unexpectedly discovered that the period during the firing frequency matters more than the torque output when designing a cylinder deactivation system to work in harmony with a machine's primary powertrain resonant frequency.

Applying the unexpected results to diesel machinery permits a newly simplified control strategy, a definite path forward that the prior art has not been in affirmative possession of, and a control strategy that routineers have heretofore been unable to achieve.

A cylinder in a firing mode receives fuel injection for combustion and the intake and exhaust valves are opened and closed according to a valve actuation scheme that permits intake of charge air in a first piston stroke (open then close intake valves), combustion on a second piston stroke, expansion on a third piston stroke, and output of exhaust on a fourth piston stroke (open then close exhaust valves). This is a 4-stroke mode firing technique and the piston moves (strokes) from top dead center (TDC) in the cylinder to bottom dead center (BDC) to TDC to BDC.

In a cylinder deactivation mode (sometimes called a "cylinder CDA mode"), the intake and exhaust valves do not open then close, nor is fuel injected. The valves are closed for the 4-strokes as the pistons reciprocate.

A method according to the decision tree of FIG. 4 comprises selecting to operate an engine between an idled condition and a first engine speed limit in decision step 402 in one of a two-cylinder CDA mode or a four-cylinder CDA mode step 404. CDA mode deactivates a number of cylinders by shutting off fueling and closing intake and exhaust valves. The two-cylinder CDA mode deactivates two engine cylinders and fires the remaining cylinders. The four-cylinder CDA mode deactivates four engine cylinders and fires the remaining cylinders.

In decision step 403, the method comprises operating the engine between the first engine speed limit and a second engine speed limit. The three-cylinder CDA mode is selected in step 405. The three-cylinder CDA mode deactivates three engine cylinders and fires the remaining cylinders.

The first engine speed limit (S1 in FIG. 1) is an engine speed below which the two-cylinder or four-cylinder CDA mode causes the machine to operate below a primary powertrain resonant frequency (shown as a band of approximately 1.5 Hz for the example in FIG. 1) and also above which the three-cylinder CDA mode causes the machine to operate above the primary powertrain resonant frequency, thus avoiding adding to the primary powertrain resonant frequency during operation.

During operation above or below the primary powertrain resonant frequency band, the selected CDA modes can still add NVH to the system, but affirmatively do not add NVH to the primary powertrain resonant frequency band.

The second engine speed limit (S2 in FIG. 1) is an engine speed above which the two-cylinder CDA mode or the four-cylinder CDA mode causes the machine to operate above the primary powertrain resonant frequency and also below which the three-cylinder CDA mode causes the machine to operate above the primary powertrain resonant frequency, thus avoiding the primary powertrain resonant frequency during operation. Operating in the CDA modes in this way does not add to the NVH in the primary powertrain resonant frequency band (13.5-15 Hertz in the example of FIG. 1).

The method can further comprise operating the engine above the second engine speed limit S2 in one of the two-cylinder CDA mode or the four-cylinder CDA mode. This can be done through to the engine's operational speed limit provided the load requirements can be met.

The two-cylinder CDA mode and the four-cylinder CDA mode comprise a similar firing period for their different firing frequency and different torque outputs. So, an additional aspect of selecting between two-cylinder and 4-cylinder CDA modes can comprise selecting which mode provides a better brake thermal efficiency (BTE). So, if a load on the machine is low enough, it is possible to use 4-cylinder deactivation mode. If the machine requires more torque output due to a higher load, then the 2-cylinder deactivation mode can be selected. If either 2-cylinder or 4-cylinder deactivation modes will satisfy the torque output requirement at the operating point, then the one with better BTE is selected. The method can comprise selecting the two-cylinder CDA mode when a torque output requirement of the machine is greater than can be supplied by the four-cylinder CDA mode and otherwise selecting the four-cylinder CDA mode when the torque output of the four-cylinder CDA mode can meet the torque output requirement of the machine.

It is possible to enter a six-cylinder firing mode when none of the two-cylinder CDA mode, the four-cylinder CDA mode, nor the three-cylinder CDA mode can meet the torque output requirement of the machine. This subjects the machine to the primary powertrain resonant frequency for which it was designed and avoids CDA modes for that time where no CDA mode can meet the load requirement. Conversely, when no load is required, it is possible to deactivate all cylinders, thus implementing a 6-cylinder deactivation mode.

The methods herein can comprise receiving a load request for operating the machine and selecting an engine speed and firing frequency to satisfy the load request. The firing frequency can be derived algorithmically as a function of the two-cylinder CDA mode, the four-cylinder CDA mode, or the three-cylinder CDA mode selected. Alternatively, an engine speed and firing period can be selected to satisfy the load request.

The methods herein can comprise receiving a load request for operating the machine and determining that one of the two-cylinder CDA mode, the four-cylinder CDA mode, and the three-cylinder CDA mode can supply sufficient torque output to satisfy the load request. Then, the method can comprise selecting one of the two-cylinder CDA mode, the four-cylinder CDA mode, and the three-cylinder CDA mode to satisfy the load request while deselecting the other ones of the two-cylinder CDA mode, the four-cylinder CDA mode, and the three-cylinder CDA mode due to those deselected modes operating at the primary powertrain resonant frequency.

The methods herein can comprise accelerating from an idled engine speed to the first engine speed limit S1 in one of the two-cylinder CDA mode or the four-cylinder CDA mode. Then, the method comprises jumping to the three-cylinder CDA mode to accelerate past the first engine speed limit. Accelerating past the first engine speed limit to the second engine speed limit is done in the three-cylinder CDA mode. Jumping to the three-cylinder CDA mode avoids resonating the machine at the primary powertrain resonant frequency.

The methods herein can comprise jumping to one of the two-cylinder CDA mode or the four-cylinder CDA mode to accelerate past the second engine speed limit. Accelerating past the second engine speed limit can be done in one of the two-cylinder CDA mode or the four-cylinder CDA mode. Jumping to one of the two-cylinder CDA mode or the four-cylinder CDA mode avoids resonating the machine at the primary powertrain resonant frequency.

The methods herein can comprise decelerating from an engine speed above the second engine speed limit in one of the two-cylinder CDA mode or the four-cylinder CDA mode. Jumping to the three-cylinder CDA mode can be done to decelerate past the second engine speed limit. Decelerating past the second engine speed limit to the first engine speed limit can be done in the three-cylinder CDA mode. Jumping to the three-cylinder CDA mode avoids resonating the machine at the primary powertrain resonant frequency.

The methods herein can further comprise jumping to one of the two-cylinder CDA mode or the four-cylinder CDA mode to decelerate past the first engine speed limit. Decelerating past the first engine speed limit can be done in one of the two-cylinder CDA mode or the four-cylinder CDA mode. Jumping to one of the two-cylinder CDA mode or the four-cylinder CDA mode avoids resonating the machine at the primary powertrain resonant frequency.

The methods herein can comprise operating the engine in one of the two-cylinder CDA mode or the four-cylinder CDA mode. The engine operates with the same firing period, but with a different firing frequency. When operating the engine in the three-cylinder CDA mode, the engine operates with a different firing frequency and different firing period than that of the two-cylinder CDA mode or the four-cylinder CDA mode.

For a different application where the primary powertrain resonant frequency is higher than shown in FIG. 1, the first engine speed limit S1 will increase to a higher RPM (rotations per minute). So too, the second engine speed limit S2 will increase to a higher RPM to enable jumping over the higher primary powertrain resonant frequency.

For a different application where the primary powertrain resonant frequency is lower than shown below, there could be two scenarios. In the first scenario, the first engine speed limit S1 will decrease and the second engine speed limit S2 will decrease. In the second scenario, the primary powertrain resonant frequency is so low that the 2- and 4-cylinder CDA modes are not needed below a first engine speed limit S1. The limit S1 can be omitted. 3-cylinder (half-engine) deactivation mode is used from idle through to the second engine speed limit S2 (now the only engine speed limit), and the second engine speed limit S2 moves to a lower RPM.

So, it is possible to vary and calibrate the ECU parameters necessary for selecting among the 2-cylinder, 3-cylinder, and 4-cylinder deactivation modes. The first and second engine speed limits can be moved in relation to changes in the primary powertrain resonant frequency.

Other implementations will be apparent to those skilled in the art from consideration of the specification and practice of the examples disclosed herein.

What is claimed is:

1. A method for jumping cylinder deactivation ("CDA") modes to avoid a primary powertrain resonant frequency in a six-cylinder diesel engine-powered machine, comprising:
   operating an engine between an idled condition and a first engine speed limit in one of a two-cylinder CDA mode or a four-cylinder CDA mode, wherein CDA mode deactivates a number of cylinders by shutting off fueling and closing intake and exhaust valves, wherein the two-cylinder CDA mode deactivates two engine cylinders and fires the remaining cylinders, and wherein the four-cylinder CDA mode deactivates four engine cylinders and fires the remaining cylinders; and
   operating the engine between the first engine speed limit and a second engine speed limit in a three-cylinder CDA mode, wherein the three-cylinder CDA mode deactivates three engine cylinders and fires the remaining cylinders,
   wherein the first engine speed limit is an engine speed below which the two-cylinder or four-cylinder CDA mode causes the machine to operate below a primary powertrain resonant frequency and also above which the three-cylinder CDA mode causes the machine to operate above the primary powertrain resonant frequency, thus avoiding the primary powertrain resonant frequency during operation.

2. The method of claim 1, wherein the second engine speed limit is an engine speed above which the two-cylinder CDA mode or the four-cylinder CDA mode causes the machine to operate above the primary powertrain resonant frequency and also below which the three-cylinder CDA mode causes the machine to operate above the primary powertrain resonant frequency, thus avoiding the primary powertrain resonant frequency during operation.

3. The method of claim 2, further comprising operating the engine above the second engine speed limit in one of the two-cylinder CDA mode or the four-cylinder CDA mode.

4. The method of claim 3, wherein operating the engine above the second engine speed limit comprises operating the engine through to its operational speed limit.

5. The method of claim 1, wherein the two-cylinder CDA mode and the four-cylinder CDA mode comprise a similar firing period for their different firing frequencies and different torque outputs, and wherein the method further comprises selecting the two-cylinder CDA mode when a torque output requirement of the machine is greater than can be supplied by the four-cylinder CDA mode and otherwise selecting the four-cylinder CDA mode when the torque output of the four-cylinder CDA mode can meet the torque output requirement of the machine.

6. The method of claim 5, comprising entering a six-cylinder firing mode when none of the two-cylinder CDA mode, the four-cylinder CDA mode, nor the three-cylinder CDA mode can meet the torque output requirement of the machine.

7. The method of claim 1, wherein the primary powertrain resonant frequency occurs at a machine-specific firing frequency across all engine speeds, and wherein the method comprises sensing engine speed during machine operation to detect the first engine speed limit and the second engine speed limit.

8. The method of claim 7, further comprising:
executing a failsafe by solving for the firing frequency of the engine during machine operation by processing information comprising the sensed engine speed and the number of cylinders that are deactivated versus firing; and
adjusting the number of cylinders that are deactivated versus firing when solving for the firing frequency of the engine indicates that operation in the primary powertrain resonant frequency is imminent.

9. The method of claim 1, further comprising:
receiving a load request for operating the machine; and
selecting an engine speed and firing frequency to satisfy the load request, wherein the firing frequency is a function of the two-cylinder CDA mode, the four-cylinder CDA mode, or the three-cylinder CDA mode selected.

10. The method of claim 1, further comprising:
receiving a load request for operating the machine;
determining that one of the two-cylinder CDA mode, the four-cylinder CDA mode, and the three-cylinder CDA mode can supply sufficient torque output to satisfy the load request; and
selecting one of the two-cylinder CDA mode, the four-cylinder CDA mode, and the three-cylinder CDA mode to satisfy the load request while deselecting the other ones of the two-cylinder CDA mode, the four-cylinder CDA mode, and the three-cylinder CDA mode due to those deselected modes operating at the primary powertrain resonant frequency.

11. The method of claim 1, comprising:
accelerating from an idled engine speed to the first engine speed limit in one of the two-cylinder CDA mode or the four-cylinder CDA mode;
jumping to the three-cylinder CDA mode to accelerate past the first engine speed limit; and
accelerating past the first engine speed limit to the second engine speed limit in the three-cylinder CDA mode,
wherein jumping to the three-cylinder CDA mode avoids resonating the machine at the primary powertrain resonant frequency.

12. The method of claim 11, further comprising:
jumping to one of the two-cylinder CDA mode or the four-cylinder CDA mode to accelerate past the second engine speed limit; and
accelerating past the second engine speed limit in one of the two-cylinder CDA mode or the four-cylinder CDA mode,
wherein jumping to one of the two-cylinder CDA mode or the four-cylinder CDA mode avoids resonating the machine at the primary powertrain resonant frequency.

13. The method of claim 1, comprising:
decelerating from an engine speed above the second engine speed limit in one of the two-cylinder CDA mode or the four-cylinder CDA mode;
jumping to the three-cylinder CDA mode to decelerate past the second engine speed limit; and
decelerating past the second engine speed limit to the first engine speed limit in the three-cylinder CDA mode,
wherein jumping to the three-cylinder CDA mode avoids resonating the machine at the primary powertrain resonant frequency.

14. The method of claim 13, further comprising:
jumping to one of the two-cylinder CDA mode or the four-cylinder CDA mode to decelerate past the first engine speed limit,
decelerating past the first engine speed limit in one of the two-cylinder CDA mode or the four-cylinder CDA mode,
wherein jumping to one of the two-cylinder CDA mode or the four-cylinder CDA mode avoids resonating the machine at the primary powertrain resonant frequency.

15. The method of claim 11, wherein, when operating the engine in one of the two-cylinder CDA mode or the four-cylinder CDA mode, the engine operates with the same firing period, but with a different firing frequency, and wherein, when operating the engine in the three-cylinder CDA mode, the engine operates with a different firing period and a different firing frequency than that of the two-cylinder CDA mode or the four-cylinder CDA mode.

16. A method for jumping cylinder deactivation ("CDA") modes to avoid a primary powertrain resonant frequency in a six-cylinder diesel engine-powered machine, comprising:
when operating the engine above an idled condition and below a first engine speed limit, implementing a three-cylinder CDA mode, wherein the three-cylinder CDA mode deactivates three engine cylinders and fires the remaining cylinders,
when operating the engine above the first engine speed limit, implementing one of a two-cylinder CDA mode or a four-cylinder CDA mode, wherein the two-cylinder CDA mode deactivates two engine cylinders and fires the remaining cylinders, wherein the four-cylinder CDA mode deactivates four engine cylinders and fires the remaining cylinders,
wherein implementing the three-cylinder CDA mode, the two-cylinder CDA mode, or the four-cylinder CDA mode comprises deactivating the corresponding number of cylinders by shutting off fueling to those cylinders and by closing intake and exhaust valves of those cylinders, and
wherein implementing the three-cylinder CDA mode, the two-cylinder CDA mode, or the four-cylinder CDA mode is restricted to engine speeds at which the machine operates above the primary powertrain resonant frequency, thus avoiding the primary powertrain resonant frequency during operation.

17. The method of claim 16, comprising restricting the implementing of the three-cylinder CDA mode, the two-cylinder CDA mode, or the four-cylinder CDA mode to engine speeds that output a firing frequency above 13.5-15 Hertz.

18. The method of claim 16, wherein the first engine speed limit is around 1000 RPMs, and wherein the method comprises switching between the three-cylinder CDA mode, the two-cylinder CDA mode, or the four-cylinder CDA mode when the engine speed accelerates or decelerates near the first engine speed.

19. The method of claim 16, further comprising switching between the three-cylinder CDA mode, the two-cylinder CDA mode, or the four-cylinder CDA mode to restrict vibration levels of the machine to less than 700 radians per second squared.

20. A method for jumping cylinder deactivation ("CDA") modes to avoid a primary powertrain resonant frequency in a six-cylinder diesel engine-powered machine, comprising:

when operating the engine above an idled condition, implementing a three-cylinder CDA mode, wherein the three-cylinder CDA mode deactivates three engine cylinders and fires the remaining cylinders, when operating the engine above a first engine speed limit, implementing one of a two-cylinder CDA mode or a four-cylinder CDA mode, wherein the two-cylinder CDA mode deactivates two engine cylinders and fires the remaining cylinders, wherein the four-cylinder CDA mode deactivates four engine cylinders and fires the remaining cylinders, wherein implementing the three-cylinder CDA mode, the two-cylinder CDA mode, or the four-cylinder CDA mode comprises deactivating the corresponding number of cylinders by shutting off fueling to those cylinders and by closing intake and exhaust valves of those cylinders, and wherein implementing the three-cylinder CDA mode, the two-cylinder CDA mode, or the four-cylinder CDA mode is restricted to engine speeds at which the machine outputs vibration levels of less than 700 radians per second squared.

* * * * *